Sept. 14, 1948.  E. BUGATTI  2,449,449
MILLING MACHINE
Filed Sept. 18, 1945
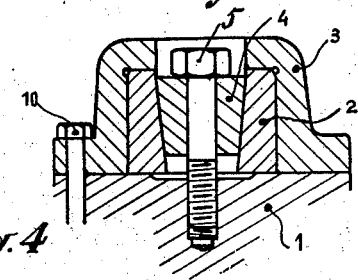
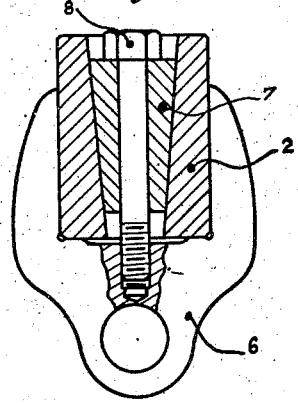
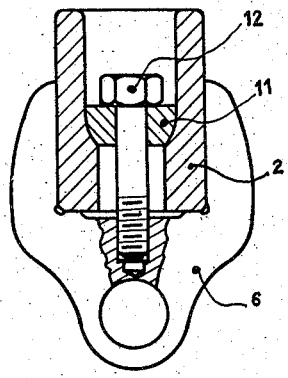
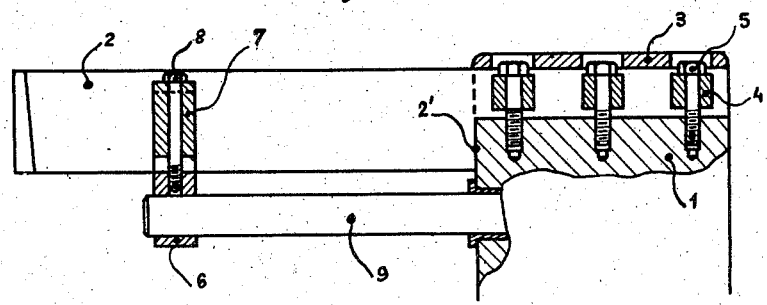
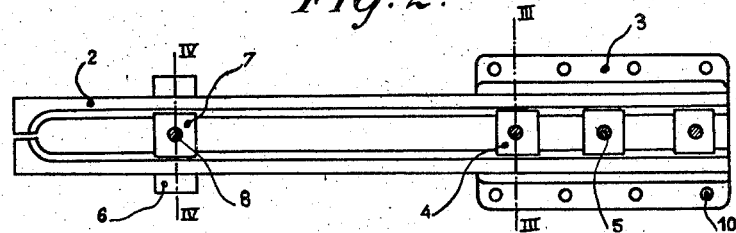
Inventor
Ettore Bugatti
By Mauro & Lewis
Attorneys Patented Sept. 14, 1948

2,449,449

UNITED STATES PATENT OFFICE 2,449,449

MILLING MACHINE

Ettore Bugatti, Paris, France

Application September 18, 1945, Serial No. 617,110
In France May 7, 1942

Section 1, Public Law 690, August 8, 1946
Patent expires May 7, 1962

6 Claims. (Cl. 90—20.5)

Milling machines are classified into two main types according as the axis of the cutter carrying spindle is vertical or horizontal. In the latter case which includes the so-called universal milling machines, the cutter is held either at the end of said spindle in overhanging position when the work is in the neighborhood of the frame, or by a chuck guided by the spindle and an auxiliary bearing or bracket when the work is far from the frame.

On small machines, the auxiliary bearing is supported from a cylindrical bar in parallel relationship with the spindle axis, the bar being embedded in the frame. On machines having a more substantial size, two parallel bars are provided; in this case, the auxiliary bearing has three bores spaced by amounts corresponding exactly with the distances between the spindle axis and the bar axes.

As the cutter is in operation, it is necessary to lock the cylindrical bar or bars in the frame and the auxiliary bearing on said bar or bars. This is made by means of split collars, adapted to be clamped with handles. The accuracy in the combination depends upon the amount of accuracy obtainable as concerns the bores and axis spacings in the frame and the auxiliary bearing.

When the above named members are being locked in operative position, by means of split collars adapted to be clamped, a relative movement thereof may occur. Hence, the accuracy in the correspondence between the bore axes and the bar axes is more or less influenced upon lightening said split collars.

In constructing such devices, a very minute accuracy in finishing those parts which determine the relative position of said members is required, thereby increasing the cost of the machine.

It is an object of my invention to provide guiding means for a cutter carrying spindle which are easier to produce and secure more accuracy in the position of the various members.

According to a preferred embodiment of this invention, a parallelepipedic over-arm or bar, accurately dimensioned as concerns its cross-section, is embedded in the machine frame. The bar guides auxiliary bearing or bearings formed with a groove to accommodate the lower part of said bar without substantial clearance. The bar is recessed and preferably split at an end to enable of mounting with a close fit, by means of adjustable wedges, the aforesaid bar in the frame or in a member rigid with the frame, and the auxiliary bearing or bearings on the bar.

As compared with the conventional device roughly described above, my device secures the following advantages: the alignment of the auxiliary bearing with the cutter carrying spindle revolving in the frame depends solely upon accuracy in the position of the bore in said bearing with respect to the face by which it rests on the bar. The working processes to reach a suitable degree of accuracy are relatively simple and easy to check. Any retouching or finishing by scratching off metal is always possible with planar surfaces and enables of making any desired correction. The bar is clamped in the frame and likewise the bearing is clamped on the bar without distortion nor throwing off centre of the bearing with respect to the cutter carrying spindle; thus the co-ordinates of position of said members are not affected in their accuracy. Finally the auxiliary bearing cannot turn about the axis of the bar which supports it, as is the case for machines provided with a cylindrical bar.

In order to show how my invention may be carried out, the following description is made with reference to the appended drawings given solely by way of example and in which:

Fig. 1 is a vertical section through the upper part of a milling machine constructed in accordance with this invention.

Fig. 2 is a corresponding plan view.

Fig. 3 is a cross-section, on a larger scale, taken along line III—III on Fig. 2.

Fig. 4 is a similar cross-section along line IV—IV of Fig. 2.

Fig. 5 is a similar view illustrating a modification.

In the horizontal or universal milling machine the upper part of which is shown on Figs. 1 and 2, frame 1 has a horizontal and plane top surface. Bar or over-arm 2 which is a prism of rectangular or square cross-section rests on frame 1; it is cut away so as positively to be held against lengthwise movement in one direction by its face 2'. In addition thereto, it is split longitudinally, the slot having a trapezoidal cross-section.

A cover plate 3 is positioned above bar 2; it is secured by bolts 10 to the top face of frame 1. Cover plate 3 is suitably machined to fit on bar 2 with the least possible clearance.

Bar 2 is held immovable in frame 1 and cover plate 3 by means of wedges 4 clamped by set screws 5 projecting into frame 1. Holes are provided for this purpose in top part of cover plate 3. Wedges 4 press bar 2 downwards and laterally, tending to flare the slot in said bar. The direction of such pressures is determined by the shape of the slot in bar 2, said shape being that of a trapezoid having its major basis upwards. Hence bar 2 is both pressed strongly on frame 1 and driven laterally against the inner faces of cover plate 3. The embedding thus provided depends upon the rigidity of cover plate 3, the number and tapering degree of wedges 4 and the strength of screws 5; these construction data may of course be selected as favorable as necessary for a good grip of bar 2.

The slot in bar 2 extends to the neighborhood of the outer end of said bar, in order to accommodate bearing or bracket 6. With a view to increase resiliency, it is advantageous to provide an opening at the non-embedded tip of bar 2, as shown on Figs. 1 and 2.

Bearing 6 has a slot or mortise suited as far as possible to the shape of bar 2; it is drawn upwards onto lower face of bar 2 by a wedge 7 clamped by a screw 8. Wedge 7 also imparts a side thrust tending to drive apart the two portions of bar 2 and push them against side wings of bearing 6. The latter is thus gripped like bar 2 in frame 1.

Bearing 6 has a bore preferably provided with a combination of conical and cylindrical bushings for taking up play (not shown). The bore aligned with that for the cutter carrying spindle in frame 1 operates to guide a cutter carrying arbor 9 diagrammatically shown as a cylindrical bar.

In the modification illustrated by Fig. 5, the device for expanding bar 2 into contact with inner faces of bearing 6, to wit wedge 11, is shaped preferably as a ball section; as screw 12 is being driven into a screw-threaded bore therefor in bearing 6, bar 2 is expanded while said bearing is drawn onto said bar. Like means may obviously be used to grip bar 2 between cover plate 3 and frame 1.

What I claim is:

1. In a milling machine, the combination of a frame portion; a removable cap secured to said frame portion, on the top surface thereof, said frame portion and cap defining between them a prismatic recess; an over-arm including a prismatic inner portion provided with a lengthwise slot fitted in said recess; and means located at least partly in the slot for expanding said over-arm inner portion.

2. In a milling machine, the combination of a frame portion having a prismatic recess close to but below its top surface said top surface having a hole for access to the recess; an over-arm including a prismatic inner portion provided with a lengthwise slot, fitted in said recess; and adjustable means located at least partly in the slot, operable through said hole, for expanding said over-arm inner portion.

3. The combination of claim 2, said means including a wedge in the slot and a screw operable through said hole, passing through the wedge and engaging the frame portion to expand the over-arm.

4. In a milling machine, the combination of a frame portion; an over-arm embedded in said frame portion, having a prismatic, longitudinally split outer portion protruding from the frame portion; a spindle supporting bracket adapted to embrace said over-arm outer portion at least on a part of its periphery, the bracket having a recess of corresponding prismatic form; and means operatively associated with the split outer portion of the over-arm, for expanding said portion into close contact with the bracket.

5. In a milling machine, the combination of a frame portion; an over-arm embedded in the frame portion, having a prismatic outer portion protruding from the frame portion, said outer portion having a lengthwise slot therein with tapering inner faces; a U-shaped spindle supporting bracket adapted to embrace said over-arm outer portion on a part of its periphery with a close fit; and a wedge jammed in said slot in the bracket zone.

6. The combination of claim 5, further comprising rigid means passing through said slot and said wedge, operatively engaging the wedge and the bracket, for connecting the latter together under stress.

ETTORE BUGATTI.

REFERENCES CITED

The following references are of record in the file of this patent:

UNITED STATES PATENTS

| Number | Name | Date |
| --- | --- | --- |
| 293,892 | Lincoln | Feb. 19, 1884 |
| 771,499 | Rogers | Oct. 4, 1904 |
| 1,152,030 | LeBlond et al | Aug. 31, 1915 |
| 1,488,653 | Sundstrand | Apr. 1, 1924 |